(12) United States Patent
Schurna et al.

(10) Patent No.: US 8,668,241 B2
(45) Date of Patent: Mar. 11, 2014

(54) LOCKING DEVICE FOR A SLIDING-ROOF ARRANGEMENT OF A MOTOR VEHICLE

(75) Inventors: Thorsten Schurna, Wiesbaden (DE); Michael Splieth, Gustavaburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/600,454

(22) Filed: Aug. 31, 2012

(65) Prior Publication Data

US 2013/0057029 A1    Mar. 7, 2013

(30) Foreign Application Priority Data

Sep. 2, 2011   (DE) .......................... 10 2011 112 262

(51) Int. Cl.
   *B60J 7/00*   (2006.01)
(52) U.S. Cl.
   USPC ................................. 296/107.2; 296/107.19
(58) Field of Classification Search
   USPC ............ 296/107.19, 107.2, 223, 224, 216.03, 296/216.06
   See application file for complete search history.

(56) References Cited

U.S. PATENT DOCUMENTS

| | | | |
|---|---|---|---|
| 1,722,227 A * | 7/1929 | Lukesh | 296/120.1 |
| 4,473,253 A | 9/1984 | Lutz et al. | |
| 5,078,447 A | 1/1992 | Klein et al. | |
| 5,141,283 A * | 8/1992 | Omoto et al. | 296/219 |
| 5,791,728 A * | 8/1998 | Hausrath | 296/216.01 |
| 7,455,352 B2 * | 11/2008 | Schumacher et al. | 296/224 |
| 7,523,983 B2 | 4/2009 | Peter et al. | |
| 7,854,475 B2 * | 12/2010 | Ito et al. | 296/216.02 |
| 7,926,875 B2 * | 4/2011 | Schmale | 297/344.11 |
| 8,061,290 B2 * | 11/2011 | de Waal | 114/201 R |
| 8,123,270 B2 | 2/2012 | Baccelli | 296/37.7 |
| 8,167,365 B2 * | 5/2012 | Geurts et al. | 296/223 |
| 8,182,029 B2 * | 5/2012 | Van Boxtel et al. | 296/216.03 |
| 8,459,730 B2 * | 6/2013 | Sawada et al. | 296/223 |
| 2004/0068839 A1 | 4/2004 | Hock et al. | |
| 2006/0249979 A1 * | 11/2006 | Queveau et al. | 296/107.19 |

FOREIGN PATENT DOCUMENTS

| | | |
|---|---|---|
| DE | 19940520 C1 | 2/2001 |
| DE | 202005002410 U1 | 4/2005 |
| EP | 0480166 A1 | 4/1992 |
| EP | 1422096 A1 | 5/2004 |
| GB | 312543 A | 5/1929 |

OTHER PUBLICATIONS

German Patent Office, German Search Report for Application No. 102011112262.5, dated Jun. 16, 2012.
UK IPO, British Search Report for Application No. 1215147.8, dated Nov. 30, 2012.

* cited by examiner

*Primary Examiner* — Lori Lyjak
(74) *Attorney, Agent, or Firm* — Ingrassia Fisher & Lorenz, PC

(57) ABSTRACT

A locking device is provided for a sliding-roof arrangement of a motor vehicle with two guide rails which can be arranged so as to be spaced apart in vehicle transverse direction, on which guide rails a slide connectable with a sliding roof is movably mounted. At least one of the slides comprises lock for steplessly locking the slide at random positions of the respective guide rail.

13 Claims, 3 Drawing Sheets

LOCKING DEVICE FOR A SLIDING-ROOF ARRANGEMENT OF A MOTOR VEHICLE

CROSS-REFERENCE TO RELATED APPLICATION

This application claims priority to German Patent Application No. 10 2011 112 262.5, filed Sep. 2, 2011, which is incorporated herein by reference in its entirety.

TECHNICAL FIELD

The technical field relates to a locking device of a sliding-roof arrangement as well as a sliding-roof arrangement equipped therewith, and further to an accordingly equipped motor vehicle, in particular a three-wheel electrically driven motor vehicle.

BACKGROUND

Sliding-roof arrangements for motor vehicles are commonly known and are used in a wide variety of configurations and designs. For example, the DE 41 00 677 A1 has disclosed a hardtop roof for a vehicle, which is retractable over several positions between a coupé position terminating the passenger compartment and a flipped-open position, in which the roof is housed in the rearward top of the vehicle. With this arrangement the roof is divided into several sections, i.e., a forward fixed panel, an intermediate panel and a rearward panel, wherein the intermediate panel is telescopically retractable into the rearward panel. In a preferred design, the roof is movable through or over four different positions. The multi-section design of such a hardtop roof requires a correspondingly complex actuating and sliding mechanism which therefore is correspondingly cost-intensive and installation-intensive.

It is desirable to provide a highly cost-effective, weight-saving, low-maintenance and, at the same time, component-tolerance-eliminating locking device for a sliding-roof as well as a corresponding sliding-roof arrangement. In addition, it is desirable to provide the locking device with a construction that is as simple and reliable as possible and which also saves space. Furthermore, other objects, desirable features and characteristics will become apparent from the subsequent summary and detailed description, and the appended claims, taken in conjunction with the accompanying drawings and this background.

SUMMARY

The locking device provided and configured for a sliding-roof arrangement, in particular for a hardtop, comprises at least two lateral guide rails which can be arranged so as to be spaced-apart in respect of the vehicle transverse direction, on which guide rails a respective slide connectable with a sliding roof or a comparable guide or glide element is movably mounted. At least one of the slides or glide elements comprises a lock for steplessly locking the slide in a random position of the respective guide rail.

The guide rails preferably extend substantially in vehicle longitudinal direction (x) and insofar define the entire sliding path of the sliding roof between an end-opening position and a closed position. The guide rails need not comprise any specified locking or holding points, thereby enabling locking of the sliding roof to be accomplished in any given position taken up by the sliding roof between opening and closing positions, solely by the slide or slides. The stepless locking of the slide, and thus of the sliding roof, provided by the lock on the guide rails fixedly arranged on the car body is able to meet individual requirements of a variety of very different users without any problems. An end-user can thus lock the sliding roof in any desired intermediate position.

In an embodiment at least one of the slides is mounted on at least one track roller and is movable along the guide rail with the same. Using one or more track rollers permits a low-friction and smooth-running relative movement of the slide and thus of the sliding roof on the oppositely arranged lateral guide rail or rails of the locking device.

In an embodiment the slide engages with the respective guide rail in a friction-contact or forcelocked contact manner when the lock is activated. The lock causes, for example, the rail to lock in a clamped manner on the guide rail, which, due to the friction-contact or forcelocked contact locking concept, may be shaped so as to be substantially planar and therefore may have an almost unchanged cross-section profile in rail longitudinal direction.

The friction-lock and/or force-lock is formed by providing for the lock to exercise sufficiently large clamping forces directed in a direction roughly vertical to the sliding direction onto the guide rail. Furthermore the lock may be designed so as to block the at least one track roller. In a further embodiment at least one of the slides comprises at least two track rollers which are space apart from each other in sliding direction and can be made to engage with a topside and/or underside of the rail. Using at least two track rollers per slide arranged one behind the other in sliding direction permits the slide to be guided in an extremely stable and tilt-free manner on the respective rail.

According to a further embodiment the slide comprises a claw laterally enclosing the rail, on the free end of which is arranged at least one spring-loaded contact roller which can be made to engage with the underside and/or topside of the rail. The contact roller and the track rollers are preferably brought into contact with different opposite sides of the rail. By further arranging the contact roller at one end of the claw laterally spanning the rail and pressing against the underside of the rail, for example via a spring force, a kind of permanent clamping mechanism is provided which fixes and holds the track rollers on the preferably profiled guide rail.

Insofar all that is necessary for locking or releasing a guiding slide is to block or release the rotary movement of the contact and/or track roller in relation to the slide. In particular, if according to a further embodiment the track roller and/or the contact roller(s) comprise a static friction-promoting coating or a soft-elastic material, locking of the respective slide in a friction-contact or forcelock-contact manner on the guide rail can be achieved solely by blocking the corresponding roller. Advantageously provision is further made for the contact roller to provide a sufficiently great contact force or pressing force, which prevents the slide from lifting off the guide rail and sliding along the same with blocked wheels, thereby effectively preventing slippage between roller(s) and rail.

The resilient support of the contact roller and/or the track rollers further has the effect of substantially compensating for any geometrical irregularities and possibly contamination of the track roller. Any component or assembly tolerances can be compensated for by the resilient support of the track rollers or contact rollers without any problems. In addition this also provides an apparatus for effectively counteracting any jamming or blocking in other ways, of the guiding or opening mechanism.

In an embodiment, a brake shoe movable with an actuating cable is arranged on at least one of the slides which brake shoe can be engaged with or disengaged from, the at least one track and/or contact roller. The brake shoe itself is also preferably spring-loaded so that in a spring-loaded starting position, for example, it can engage with the at least one track roller for blocking the same. By operating the actuating cable designed for transferring push and/or pull forces, the brake shoe can be disengaged, against the spring-force, from the at least one track roller so that the sliding roof is able to slide back and forth as desired in the sliding direction specified by the guide rails between an opening and a closing position.

As soon as the actuating cable ceases to be operated, the brake shoe, due to the corresponding spring effect, can largely automatically assume its locking or blocking position, thereby ensuring that the sliding roof is substantially automatically locked on the guide rails. Insofar the locking mechanism is designed so as to be self-locking and uses active operation of an actuating cable in operative connection with the brake shoe, in order to release and move the sliding roof.

Furthermore, it has been proven to be advantageous if both slides movably mounted in vehicle transverse direction on opposite sides and in parallel with the guide rails each comprise a brake shoe which can be brought into engagement with the at least one track roller. With this arrangement the brake shoes of the opposing slides are preferably coupled with each other together with the actuating cable extending in vehicle transverse direction (y) along the sliding roof. The actuating cable may further be coupled in approximately its middle with an actuator thereby enabling a push- and/or pull force to be transferred to the brake shoes of both slides, preferably in equal parts simultaneously and as uniformly as possible by means of an electric servo-motor or drive motor.

Further, in an ancillary aspect, a sliding-roof arrangement for a motor vehicle is provided, which comprises a previously described locking device as well as a sliding-roof cover, which is preferably non-detachably connected with the slide of the locking device and movable along the guide rails of the locking device by means of the slide or slides. In another embodiment, the sliding-roof cover may be designed as an arched hood extending over the entire vehicle roof and between opposite lateral waist lines of the vehicle. The sliding roof or the sliding-roof cover in this case does not comprise a substantially planar panel, but preferably a hood-like contour which substantially surrounds and encloses the vehicle interior or a passenger compartment of the motor vehicle above the waist line or above the lateral entrance both in vehicle vertical direction and in vehicle transverse direction.

Furthermore provision may be made for the hood to be designed in one piece and to be rigid, in other words to be designed as a one-piece hardtop and so that it can be pushed, in the open position, onto a rearward body section adjacent the roof opening to be exposed. Depending upon the opening position or the opening angle of the hood, a cabrio or targa configuration may be provided for the motor vehicle.

The guide rails of the locking device may, for example, be arranged so as to come to rest on the lower lateral ends of the hood and may be arranged at about waist line level of the vehicle, depending the hood design. They would then be situated below an entrance into the passenger compartment. Further guides and guide rails may be additionally provided which for example would be situated, when viewed in driving direction, in a rearward section of the body behind the hood for guiding and stabilizing the hood centrally during movement into an open position facing the rear of the vehicle.

Finally a motor vehicle is provided according to an embodiment that comprises a previously described sliding-roof arrangement and/or a previously described locking device.

BRIEF DESCRIPTION OF THE DRAWINGS

The detailed description is presented in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
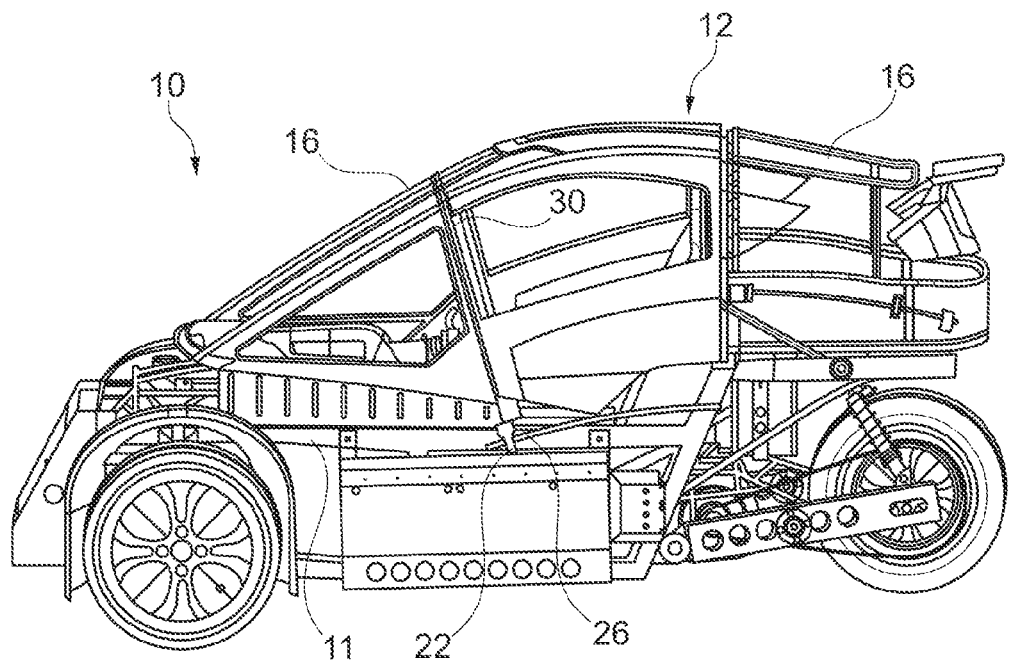
FIG. 1 shows a three-wheel motor vehicle with a steplessly lockable movable canopy hood shown in closed position.
Figure 2:
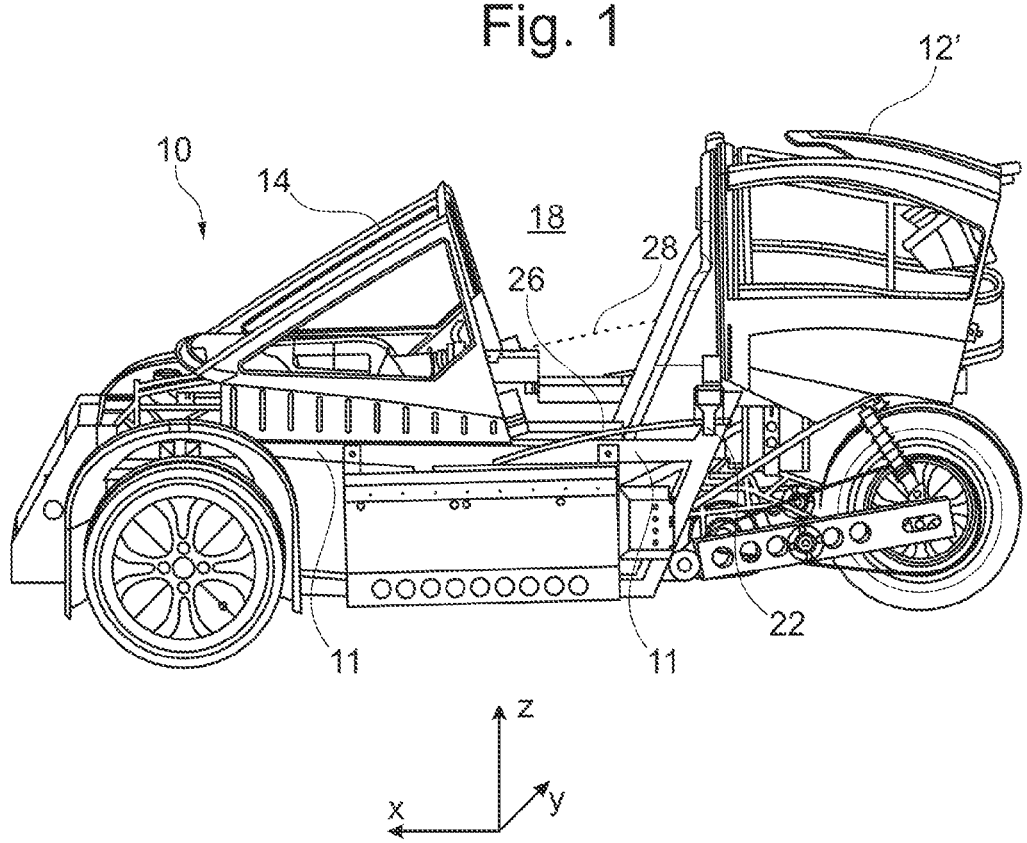
FIG. 2 shows a drawing of the vehicle according to FIG. 1 with opened canopy hood.

The motor vehicle 10 shown in FIG. 1 and FIG. 2 is predominantly designed as a three-wheel electric vehicle comprising two wheels on opposite sides of on its front axle, but only one wheel arranged centrally on its rear axle vaguely in vehicle transverse direction (y). In the front, facing in driving direction, the vehicle comprises a front windscreen 14 and behind it a movably arranged canopy hood 12, which when in the open position shown in FIG. 2 permits entry into the vehicle interior 18.

Towards the back, in opposite direction to the driving direction and adjacent to the closed canopy hood 12, a vehicle-rear-side paneling 16 is provided, onto which the opened hood 12' can be pushed, as can be seen in FIG. 2. In FIG. 1 and FIG. 2 two lateral guide rails 26, 28 are indicated, which are arranged approximately level with the main frame 11 of motor vehicle 10 and which are aligned or designed so as to correspond to the sliding movement of hood 12, 12'.

With this arrangement the hood 12 is movably mounted on the body via two guiding slides 22, 24 that are in engagement, respectively, with a rail 26, 28. The main frame 11 of the body is designed so as to extend circumferentially, i.e., in circumference direction substantially without interruption and is situated roughly level with the shock absorber arrangement, i.e., approximately level with the upper wheel rim. The entrance into the passenger compartment 18 exposed by the hood 12 is above the main frame 11 as well as above the guide rail 26, 28 provided for the movement of the hood.

Figure 3:
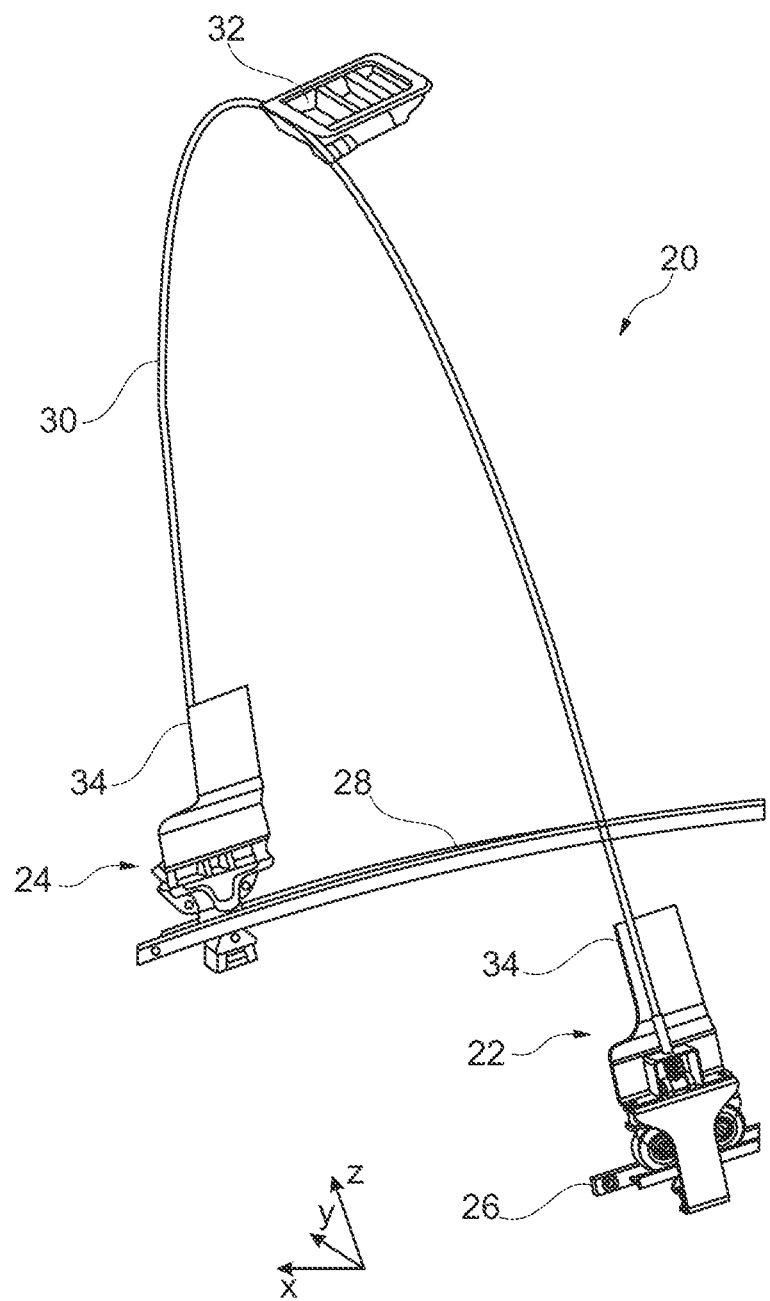
FIG. 3 shows a schematic drawing of the cabin hood guiding slides movably mounted on guide rails extending in parallel.
Figure 4:
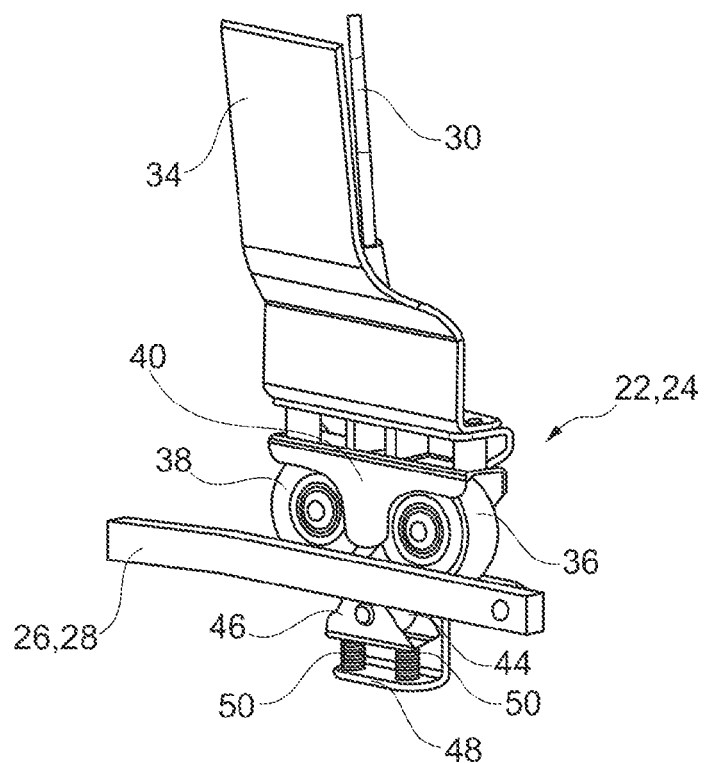
FIG. 4 shows an enlarged drawing of a slide guide viewed from the inside.
Figure 5:
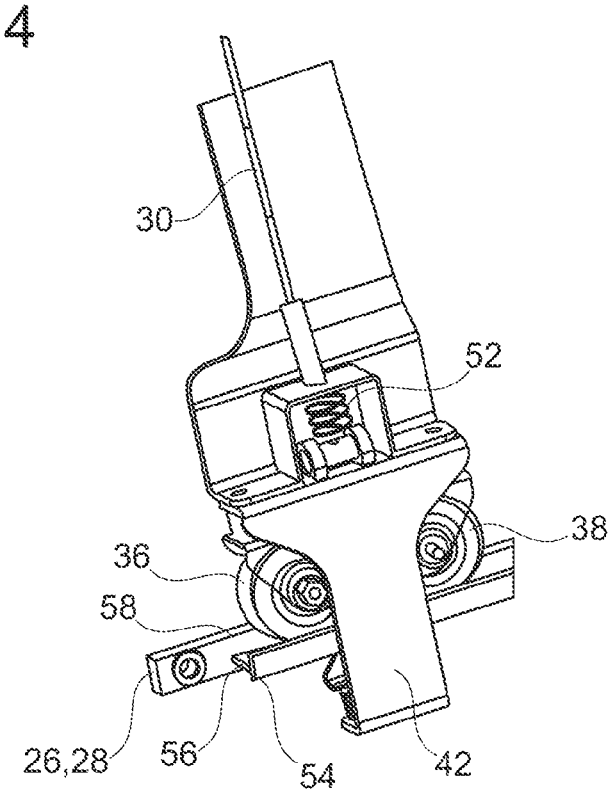
FIG. 5 shows a slide guide according to FIG. 4 viewed from the outside.

In the different representations of FIG. 3 to FIG. 5 the locking device 20 is shown in isolation. It comprises two lateral guide rails 26, 28 and guiding slides 22, 24 movable thereon in rail longitudinal direction, the mounting plate 34 of which, which protrudes upward in vehicle vertical direction (z) can be fixedly connected to hood 12. The two guiding slides 22, 24 are coupled with each other via an actuating cable 30 following the arch of the hood in vehicle transverse direction and vehicle vertical direction (y), which actuating cable is retained by a holder 32 approximately centrally between the guiding slides 22, 24. The holder 32 may be used to activate or operate the actuating cable 30, thereby introducing an even force into the two free end portions of the actuating cable 30 in the area of the opposing guiding slides 22, 24.

The guide rails 26, 28 comprise a cross-section geometry that is largely constant in rail longitudinal direction, which allows the slides 22, 24 to be steplessly locked in any feasible position of the hood in relation to the guide rail 26, 28. The guiding slides 22, 24 shown in detail from different sides in FIG. 4 and FIG. 5, respectively comprise track rollers 36, 38 spaced apart from each other in moving direction, by which the respective slide 22, 24 is guidable along the respective guide rail 26, 28 producing little friction and running smoothly. The slides 22, 24 further respectively comprise a claw 42 laterally spanning the respective guide rail 26, 28 which claw, with an inwardly protruding supporting section 48 partly covered by the respective rail 26, 28, comes to rest at a specified distance below the rail 26, 28.

At the free end or supporting section 48 are arranged two compression springs 50 facing the guide rail 26, 28, which springs press a holder 46 serving as a bearing for a contact roller 44 against the underside of the respective guide rail 26, 28. This has the effect of the guide rail 26, 28 being squeezed in by oppositely arranged track rollers 36, 38 on the one hand and a contact roller 44 on the other, essentially vertical to the running direction (x).

A permanent contact may thereby be achieved between the track rollers 36, 38 and the guide rail 26, 28 in order to counteract any slip between track rollers 36, 38 and guide rail 26, 28. Furthermore a brake shoe 40 is provided on the topside of slides 22, 24 which is movably arranged in longitudinal direction vertically to rail 26, 28 which brake shoe is mounted approximately vertically to the movement direction of slides 22, 24 and movably in relation to same.

The brake shoe 40 also may be spring-loaded in order to keep it permanently engaged with track rollers 36, 38. Furthermore the brake shoe 40 is coupled with the actuating cable 30, in particular in order to transfer the same from a locking or blocking position into a releasing position against a force applied by a further compression spring 52. Insofar the locking device 20 is preferably designed as a self-locking device so that a release of the locking device always requires an active operation via the actuating cable 30. The spring-loaded mounting of the contact roller 44 and, if required, that of the track rollers 36, 38 permits to balance and tolerate any component tolerances or contamination of the guide rails 26, 28 without any problems.

FIG. 5 further shows that the guide rails 26, 28 comprise a running surface 56 bordered by two lateral guiding profiles 54, 58, on which the track rollers 36, 38 are guided. The lateral guiding profiles 54, 58 in conjunction with the contact mechanism formed by the springs 50, the contact roller 44 and the over-reaching claw 42 prevents the track rollers 36, 38 from leaving or becoming detached from, the guide rails 26, 28.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A locking device for a sliding-roof arrangement of a motor vehicle, comprising:
    a first guide rail;
    a second guide rail that is spaced-apart from the first guide rail in relation to a vehicle transverse direction,
    a first slide that is connectable with a sliding roof that is movably mounted on the first guide rail, wherein the first slide comprises a claw laterally enclosing the first guide rail at a free end of which a contact roller is arranged for engagement with one of a top side and an underside of the first rail;
    a second slide that is connectable with the sliding roof that is movable mounted on the second guide rail; and
    a lock for the first slide that is configured to steplessly lock at random positions of the first guide rail.

2. The locking device according to claim 1, wherein the second slide is slidable on a track roller mounted along the second guide rail.

3. The locking device according to claim 1, wherein the lock is configured to operate in a friction-lock manner.

4. The locking device according to claim 1, wherein the lock is configured to operate in a force-lock contact manner.

5. The locking device according to claim 1, wherein the first slide comprises at least two track rollers spaced-apart in a sliding direction that are configured for engagement with a topside of the first guide rail.

6. The locking device according to claim 1, wherein the first slide comprises at least two track rollers spaced-apart in a sliding direction that are configured for engagement with an underside of the first guide rail.

7. The locking device according to claim 6, wherein the contact roller is a spring-loaded contact roller arranged for engagement with the topside of the first guide rail.

8. The locking device according to claim 6, wherein the contact roller is a spring-loaded contact roller arranged for engagement with the underside of first guide rail.

9. The locking device according to claim 2, wherein the track roller comprises a static friction-promoting coating at an outer circumference.

10. The locking device according to claim 2, wherein the track roller comprises a static friction-promoting coating at an outer circumference.

11. The locking device according to claim 9, further comprising a brake shoe movable with an actuating cable that is arranged on the first slide,
    wherein the brake shoe is configured to engage with the track roller.

12. The locking device according to claim 11,
    wherein the first slide and the second slide are movably mounted opposite each other on the first guide rail and the second guide rail in the vehicle transverse direction and in parallel thereto,
    wherein the locking device further comprises the brake shoe that is configured for engagement with the track roller,
    wherein the brake shoe is coupled with the actuating cable extending along the sliding roof in the vehicle transverse direction.

13. The locking device according to claim 12, wherein the brake shoe is tensioned and in engagement with the track roller and transferable into a release position against a spring force.

* * * * *